(12) United States Patent
Araki et al.

(10) Patent No.: US 6,212,497 B1
(45) Date of Patent: Apr. 3, 2001

(54) WORD PROCESSOR VIA VOICE

(75) Inventors: Nobumasa Araki; Jun Noguchi; Mitsuru Nishiura, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/198,266

(22) Filed: Nov. 24, 1998

(30) Foreign Application Priority Data

Nov. 25, 1997 (JP) ........................................ 9-323594

(51) Int. Cl.⁷ .................... G10L 15/04; G10L 21/06; G06K 9/72
(52) U.S. Cl. .................... 704/235; 704/275; 704/231; 704/270; 382/229
(58) Field of Search .................... 704/270, 275, 704/235, 251, 231

(56) References Cited

FOREIGN PATENT DOCUMENTS

| 54-148304 | 11/1979 | (JP) . |
|---|---|---|
| 61-177573 | 8/1986 | (JP) . |
| 1-197797 | 8/1989 | (JP) . |
| 4-254896 | 9/1992 | (JP) . |

OTHER PUBLICATIONS

IBM™ ("Voice Type™ Dictation for OS/2 User's Guide©", Nov. 1994).*
McKenzie ("VoiceType™ Simply Speaking Gold," product review for WindoWatch Sep. 28, 1997).*
Rye ("VoiceType™ Dictation 3.0 FAQ," Rye Computer Corp. support site, Jun. 1999).*
IBM–UK ("ViaVoice™ Support," IBM™ Support website, May 1999).*

\* cited by examiner

Primary Examiner—Tālivaldis I. Šmits
Assistant Examiner—Daniel A Nolan
(74) Attorney, Agent, or Firm—Sughrue, Mion, Zinn, Macpeak & Seas, PLLC

(57) ABSTRACT

The word processor of the present invention comprises: a voice inputting device for inputting spoken word and converting the spoken word into voice data; a voice storage device for storing the voice data; a speech recognition device for recognizing a word in the voice data output from the voice inputting device or the voice data stored by the voice storage device; a display for displaying a result obtained by the voice recognition device; an instruction inputting device for inputting an instruction to select a portion in the result; and a correction device for correcting the portion in the result according to the instruction from the instruction inputting device.

19 Claims, 2 Drawing Sheets

WORD PROCESSOR VIA VOICE

FIELD OF THE INVENTION

The present invention relates to a word processor, and in particular to a word processor for inputting words by way of voice.

This application is based on Japanese Patent Application No. Hei 9-323594, the contents of which are incorporated herein by reference.

BACKGROUND ART

Various voice recognition apparatuses for inputting words by way of the voice have been proposed. The conventional voice recognition apparatus recognizes each word among words spoken by a user and indicates the result, which includes the recognized word, on the display. It is necessary to correct the result since the recognition rate of such a speech recognition apparatus is not always perfect.

FIG. 4 is a block diagram showing a construction of the conventional speech recognition apparatus, which comprises a voice inputting device 11, a speech recognition device 12, a recognition result holder (storage device) 13, and a display 14. The speech recognition device 12 automatically recognizes spoken words input from the voice inputting device 11, and the recognition result is stored in the recognition result holder 13 and indicated on the display 14.

The conventional speech recognition apparatus further includes an instruction inputting device 17 for inputting user instructions for corrections, and a corrector 15 for correcting the recognition result stored in the recognition result storage device 13.

In a correction process, the display 14 indicates the recognition result, which includes the recognized word and is supplied from the speech recognition device 12, and displays one or more candidates whose pronunciations are similar if the result includes a mis-recognized portion. The user appropriately selects one of the displayed candidates through the inputting device 17 to correct the result, so that the corrector 15 corrects the result stored in the recognition result holder 13.

The conventional speech recognition apparatus and the method for correcting the recognition result are disclosed in Japanese Patent Application, First Publication Nos. Sho 61-177573 and Hei 1-197797.

The conventional apparatus which performs continuous word recognition, allowing a user to pronounce word strings not discretely but fluently, cannot determine breakpoints in word strings because the words are continuously spoken, and often mis-recognizes a single word as two or more words.

While in the conventional correction method some word candidates are displayed according to a user instruction, the user can not correct two or more words to a single word but must correct the single word to another single word. Therefore, the user must delete the mis-recognized portion and must enter a new word, and it is therefore difficult to efficiently input words via the voice, for example, in Japanese.

SUMMARY OF THE INVENTION

It is an object of the present invention to provide a word processor which can efficiently input words by way of voice, for example, in Japanese, even when a single word is misidentified as two or more words.

In order to accomplish the above object, the word processor of the present invention comprises: a voice inputting device for inputting a spoken word and converting the spoken word into voice data; a voice storage device for storing the voice data; a speech recognition device for recognizing a word in the voice data output from the speech inputting device or the voice data stored by the voice storage device; a display for displaying a result obtained by the speech recognition device; an instruction inputting device for inputting an instruction to select a portion in the result; and a correction device for correcting the portion in the result according to the instruction from the instruction inputting device.

In another aspect of the present invention, the word processor of the present invention further comprises a result storage device for storing the result obtained by the speech recognition device. The speech recognition device recognizes a word in the voice data from the voice inputting device in response to an input of the voice data from the voice inputting device, and recognizes a word in the voice data stored in the voice storage device in response to an input of the instruction to select a portion to be corrected. The display indicates one or more results when the speech recognition device recognizes a word in the voice data stored in the voice storage device.

The correction device corrects the selected portion to a single word. The correction device selects one of the results according to an instruction through the instruction inputting device. The instruction inputting device may be a mouse, a keyboard, or a voice command system.

A word processing method of the present invention comprises the steps of: converting input spoken words into voice data; storing the voice data data; displaying a result obtained by the recognition on a display; and recognizing a word in a selected portion of the stored voice data.

The word processing method further comprises the step of storing the result. The selected portion may be corrected to a single word. The word processing method further comprises the step of displaying a second result obtained by recognition for the selected portion. The word processing method further comprises the steps of: displaying a plurality of second results for the selected portion; and selecting one of the second results according to a user instruction.

A computer readable medium of the present invention containing program instructions performs the steps of: converting an input spoken words into voice data; storing the speech data; recognizing a word in the voice data; displaying a result obtained by the recognition on a display; and recognizing a word in a selected portion of the stored voice data.

The computer readable medium further performs the storing of the result. The selected portion may be corrected to a single word. The computer readable medium further performs display of a second result obtained by recognition for the selected portion. The computer readable medium further performs displaying a plurality of second results for the selected portion; and selecting one of the second results according to a user instruction.

According to the present invention, because portions specified by a user are recognized as a single word, two or more words mis-recognized in the result of continuous word recognition can be corrected to a single word. This eliminates the operations deleting and re-inputting words, thereby making inputting by way of voice easy.

DETAILED DESCRIPTION OF THE PREFERRED EMBODIMENTS

Figure 1:
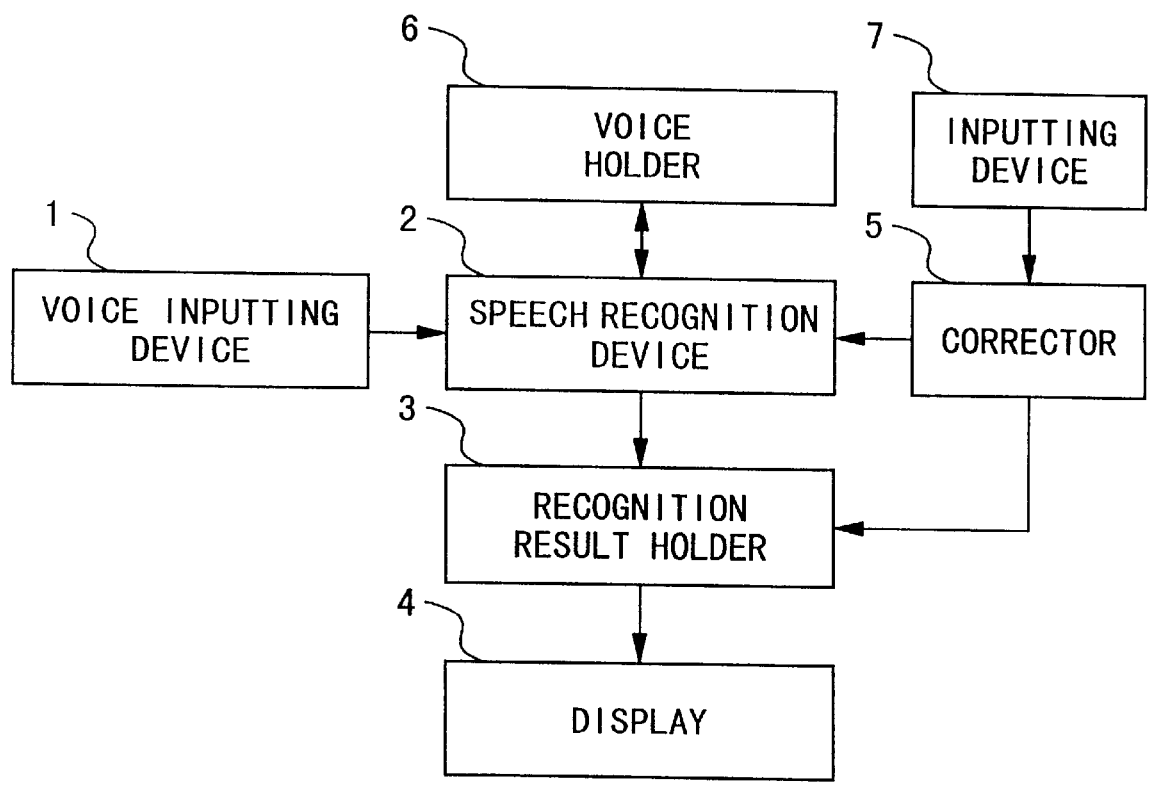
FIG. 1 is a block diagram showing a construction of a word processor in accordance with an embodiment of the present invention.

The preferred embodiment of a word processor of the present invention will be described below with reference to the figures. FIG. 1 is a block diagram showing a construction of a word processor in accordance with an embodiment of the present invention. The word processor comprises a speech inputting device 1 for inputting words spoken by a user, a speech recognition device 2 for recognizing a word in the spoken words input through the voice inputting device 1, a recognition result holder (recognition result storage device) 3 for storing a recognition result, which includes the word recognized by the speech recognition device 2, and a display 4 for displaying the result.

Besides the above constructions, the word processor comprises a corrector 5 for correcting the result, a voice holder (voice storage device) 6 for storing the input voice, and an instruction inputting device 7 such as a keyboard and a mouse. The voice inputting device 1 receives words spoken by a user and transmits the voice data to the speech recognition device 2. The speech recognition device 2 performs speech recognition for the input voice data, transmits the result to the recognition result holder 3, and transmits the input voice data to the voice holder 6. The result includes a word recognized in the voice data.

The recognition result holder 3 stores the result transmitted from the speech recognition device 2. The display 4 refers to the recognition result holder 3 and displays the result. The corrector 5 corrects contents in the recognition result holder 3 and directs the speech recognition device 2 to re-recognize a word in the voice data when receiving a correction instruction through the instruction inputting device 7.

The voice holder 6 stores the input voice data. The instruction inputting device 7 receives the user's operation, and transmits an instruction command to the corrector 5 when the operation includes an instruction to correct the result.

An operation of the word processor of the present invention will be described in the following. When a user inputs words through the voice inputting device 1, the spoken words are converted into the voice data, which is transmitted to the speech recognition device 2. The speech recognition device 2 processes the input voice data, transmits the results, which are one or more candidates, to the recognition result holder 3, and simultaneously transmits the voice data to the voice holder 6. The results transmitted from the speech recognition device 2 to the recognition result holder 3 and the voice data transmitted from the speech recognition device 2 to the voice holder 6 are stored, respectively.

After the above-described processes, the first candidate stored in the recognition result holder 3 is indicated on the display 4. When it is necessary to correct the result on the display 4, the user inputs an instruction to make correction through the instruction inputting device 7. In response to the user's instruction, the corrector 5 performs the correction.

When the instruction input by the user is to correct a single word, the corrector 5 only corrects the single word in the result stored in the recognition result holder 3.

Figure 2:
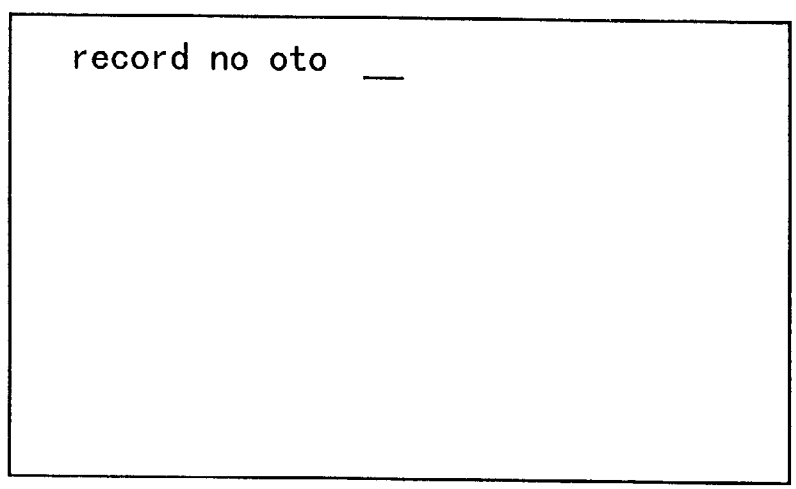
FIG. 2 is a view showing an example of a mis-recognized content displayed on a display.

For example, when the user pronounces "record note", "record no oto" is often displayed due to mis-recognition. FIG. 2 shows the contents displayed on the display 4 in the mis-recognition case. To correct the two words "no oto" to the single word "note", the user inputs an instruction specifying the two words "no oto". For example, the user specifies the words "no oto" by dragging a mouse which is the instruction inputting device 7. The corrector 5 recognizes that the selected "no oto" is a single word, and directs the speech recognition device 2 to correct the result.

Figure 3:
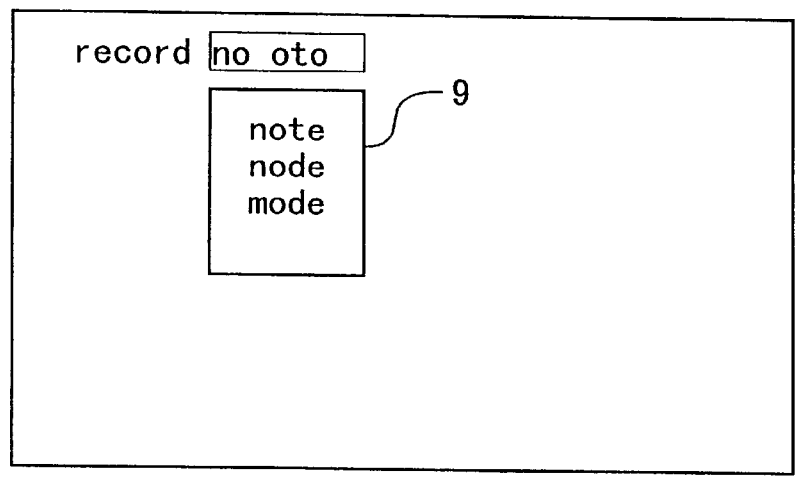
FIG. 3 is a view showing an example of a content which includes candidates before correction of two or more mis-recognized words.
Figure 4:
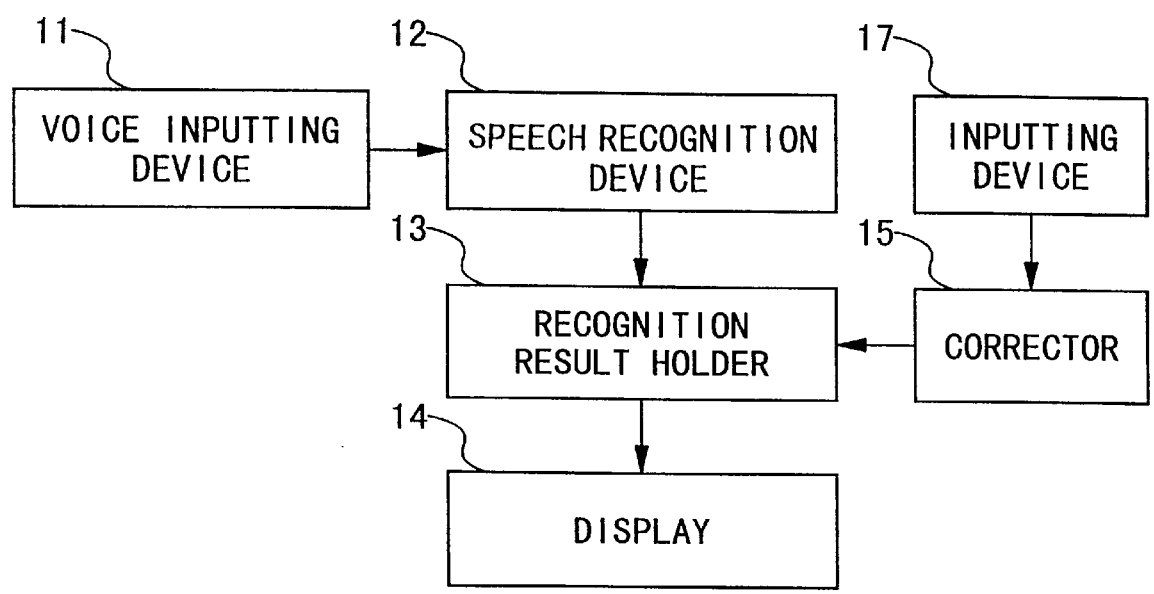
FIG. 4 is a block diagram showing a construction of a conventional speech recognition apparatus.

The speech recognition device 2 reads a portion of the voice data corresponding to "no oto" from the voice holder 6, and performs discrete word recognition. The speech recognition device 2 transmits a second result to the result holder 3, and replaces "no oto" by "note". The display 4 reads the second result from the recognition result holder 3 and displays it in a candidate window 9 (shown in FIG. 3). FIG. 3 shows the second results on the display 4, which are candidates to correct the first result when the single word is mis-recognized as several words.

As shown in FIG. 3, "note", "node", and "mode" are displayed as the candidates, and the user can select "note" to correct the first mis-recognized result. While in the embodiment the user gives the instruction by dragging the mouse, the instruction method is not limited to the embodiment, and other methods using a keyboard or a voice command system for inputting a command via speech may be applied.

While in the embodiment the method for correcting the result by the speech recognition device 2 includes discrete word recognition for the voice data corresponding to the portion specified by the user, a plurality of candidates of single words corresponding to the specified portion may be searched and displayed as the first results, which are stored in the recognition result holder 3. While in the embodiment the second result is displayed on the candidate window, only the first candidate in the corrected result may be displayed. Preferably, the present invention is applied to a Japanese word processor.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A word processor comprising:
   a voice inputting device for inputting a spoken word and converting said spoken word into voice data;
   a voice storage device for storing said voice data;
   a speech recognition device for recognizing words in said voice data output from said voice inputting device or said voice data stored by said voice storage device;
   a display for displaying a result obtained by said voice recognition device;
   an instruction inputting device for inputting an instruction to select a portion in said result; and
   a correction device for correcting said portion in said result according to said instruction from said instruction inputting device by repeating word recognition of store voice data corresponding to the selected portion in said result.

2. A word processor according to claim 1, further comprising a result storage device for storing said result obtained by said voice recognition device.

3. A word processor according to claim 1, wherein said speech recognition device recognizes a word in said voice data from said speech inputting device in response to an input of said voice data from said voice inputting device, and recognizes a word in said voice data stored in said voice storage device in response to an input of said instruction to select a portion to be corrected.

4. A word processor according to claim 3, wherein said display indicates one or more results when said speech recognition device recognizes a word in said voice data stored in said speech storage device.

5. A word processor according to claim 1, wherein said correction device corrects said selected portion to a single word.

6. A word processor according to claim 4, wherein said correction device selects said one of said results according to an instruction through said instruction inputting device.

7. A word processor according to claim 1, wherein said instruction inputting device is a mouse.

8. A word processor according to claim 1, wherein said instruction inputting device is a keyboard.

9. A word processor according to claim 1, wherein said instruction inputting device is a voice command system.

10. A word processing method comprising the steps of:
    converting an input spoken words into voice data;
    storing said voice data;
    recognizing a word in said voice data;
    displaying a result obtained by the recognition on a display; and
    recognizing a word in a selected portion of said stored voice data by repeating word recognition of said stored voice data corresponding to the selected portion in said result.

11. A word processing method according to claim 10, further comprising the step of storing said result.

12. A word processing method according to claim 10, wherein said selected portion is corrected to a single word.

13. A word processing method according to claim 10, further comprising the step of displaying a second result obtained by recognition for said selected portion.

14. A word processing method according to claim 10, further comprising the steps of:
    displaying a plurality of second results for said selected portion; and
    selecting one of said second results according to a user instruction.

15. A computer readable medium containing program instructions for performing the steps comprising:
    converting an input spoken words into voice data;
    storing said voice data;
    recognizing a word in said voice data;
    displaying a result obtained by the recognition on a display; and
    recognizing a word in a selected portion of said stored voice data by repeating word recognition of said stored voice data corresponding to the selected portion in said result.

16. A computer readable medium according to claim 15, containing program instructions for performing the steps further comprising storing said result.

17. A computer readable medium according to claim 15, wherein said selected portion is corrected to a single word.

18. A computer readable medium according to claim 15, containing program instructions for performing the steps further comprising displaying a second result obtained by recognition for said selected portion.

19. A computer readable medium according to claim 15, containing program instructions for performing the steps further comprising:
    displaying a plurality of second results for said selected portion; and
    selecting one of said second results according to a user instruction.

* * * * *

UNITED STATES PATENT AND TRADEMARK OFFICE
CERTIFICATE OF CORRECTION

PATENT NO. : 6,212,497 B1
DATED : April 3, 2001
INVENTOR(S) : Nobumasa Araki, Jun Noguchi, Mitsuru Nishiura It is certified that error appears in the above-identified patent and that said Letters Patent is hereby corrected as shown below:

Column 2,
Line 32, delete "data";
Line 32, after "data" insert -- recognizing a word in the voice data; --

Title page,
Delete "WORD PROCESSUR VIAVOICE" insert -- VOICE WORD PROCESSOR THAT CORRECTS WORD GROUPS --

Signed and Sealed this

Twenty-third Day of October, 2001

Attest:

*Nicholas P. Godici*

NICHOLAS P. GODICI
*Attesting Officer*     *Acting Director of the United States Patent and Trademark Office*